United States Patent [19]

Hornbeck

[11] Patent Number: 5,280,277
[45] Date of Patent: Jan. 18, 1994

[54] FIELD UPDATED DEFORMABLE MIRROR DEVICE

[75] Inventor: Larry J. Hornbeck, Van Alstyne, Tex.

[73] Assignee: Texas Instruments Incorporated, Dallas, Tex.

[21] Appl. No.: 978,300

[22] Filed: Nov. 17, 1992

Related U.S. Application Data

[63] Continuation of Ser. No. 546,332, Jun. 29, 1990, abandoned.

[51] Int. Cl.⁵ .............................................. G09G 3/16
[52] U.S. Cl. ............................... 345/108; 340/815.04
[58] Field of Search ............ 340/764, 815.05, 815.17, 340/815.26, 815.29; 359/230

[56] References Cited

U.S. PATENT DOCUMENTS

| | | | |
|---|---|---|---|
| 3,746,911 | 7/1973 | Nathanson et al. | 315/21 |
| 4,566,935 | 1/1986 | Hornbeck . | |
| 4,615,595 | 10/1986 | Hornbeck | 353/122 |
| 4,662,746 | 5/1987 | Hornbeck . | |
| 4,710,732 | 12/1987 | Hornbeck | 332/7.51 |
| 4,725,832 | 2/1988 | Lorteije et al. | 350/269 |
| 5,061,049 | 10/1991 | Hornbeck . | |
| 5,096,279 | 3/1992 | Hornbeck . | |
| 5,083,857 | 6/1992 | Hornbeck | 359/291 |

FOREIGN PATENT DOCUMENTS

| | | |
|---|---|---|
| 332953 | 9/1989 | European Pat. Off. . |
| 0366117 | 5/1990 | European Pat. Off. . |
| WO86/01626 | 3/1386 | PCT Int'l Appl. ........ 340/764 |
| 2123247 | 1/1984 | United Kingdom . |

OTHER PUBLICATIONS

Hornbeck, Larry J., "Deformable-Mirror Spatial Light Modulators", SPIE Critical Reviews Series, vol. 1150, Aug. 6, 1989, pp. 86-102.

*Primary Examiner*—Ulysses Weldon
*Attorney, Agent, or Firm*—Brian C. McCormack; James C. Kesterson; Richard L. Donaldson

[57] ABSTRACT

The bistable deformable mirror device (DMD) used in a high-definition television (HDTV) application must be capable of supporting at least 128 grey levels, using pulse-width modulation. If the DMD is line-updated, then the minimum field time to support 128 grey levels cannot be achieved because of the time required to perform a resonant reset once each line. This disclosure shows how the DMD can be field-updated in order to achieve the minimum required field time.

8 Claims, 3 Drawing Sheets

FIELD UPDATED DEFORMABLE MIRROR DEVICE

This application is a continuation of Ser. No. 07/546,332, filed Jun. 29, 1990, now abandoned.

TECHNICAL FIELD OF THE INVENTION

This invention relates to deformable mirror devices and more particularly to an arrangement for field updating the DMD array.

RELATED APPLICATIONS

All of the following patent applications are cross-referenced to one another and all have been assigned to Texas Instruments Incorporated. These applications have been concurrently filed and are hereby incorporated in this patent application by reference.

| U.S. Pat. No. | |
| --- | --- |
| U.S. Pat. No. 5,083,857 | Multi-Level Deformable Mirror Device |
| U.S. Pat. No. 5,142,405 | Improved Bistable DMD Addressing Circuit and Method |
| U.S. Pat. No. 5,018,256 | Improved Architecture and Process for Integrating DMD with Control Circuit Substrates |

Also referenced herein and incorporated by reference

| U.S. Pat. No. 5,061,049 | Spatial Light Modulator and Method, Serial #355,049, filed May 15, 1989; |
| --- | --- |
| 5,096,279 | Spatial Light Modulator and Method, Serial #408,355, filed September 14, 1989; |
| U.S. Pat. No. 4,662,746 | Spatial Light Modulator and Method Dated May 5, 1987; |
| U.S. Pat. No. 4,566,935 | Spatial Light Modulator and Method Dated January 28, 1986; and |
| U.S. Pat. No. 4,615,595 | Frame Addressed Spatial Light Modulator Dated October 7, 1986 |

BACKGROUND OF THE INVENTION

Bistable deformable mirror devices (DMDs) are the subject of the above-listed copending U.S. patent application entitled SPATIAL LIGHT MODULATOR, U.S. Pat. No. 5,061,049. There are many uses for such devices, such as, for example, a projection light valve for high definition television (HDTV). In certain of these applications, it must be capable of supporting at least 128 grey levels. Because the bistable DMD is a binary device, grey levels are achieved by pulse-width modulation.

There are two approaches to pulse-width modulation. The first approach is to divide the video frame period $\tau_f$ into 128 equal time intervals or fields. During each field, all of the pixels in the array are addressed to one of two states; the positive landing angle (on) or the negative landing angle (off).

The second approach is to express the 128 equal time intervals as combinations of seven time intervals, each interval being a multiple of two times the previous interval. The seven time intervals would be the multiples 1, 2, 4, 8, 16, 32, and 64 of $\tau_f/128$. This approach minimizes the amount of off-chip frame buffer memory that is required.

The shortest field time is $\tau_f/128$, regardless of which pulse-width modulation approach is chosen. For a DMD projection light valve system where the three color fields are generated in parallel during the standard TV frame time of 33.3 mS, the shortest field time is $\tau_f/128 = 260$ µs. During this 260 µs time interval, the 1050 lines of the DMD must be updated, one line at a time. If the bottom 525 lines were to be addressed in parallel with the top 525 lines, then the time available for each line update would be 260 µs/525 = 0.5 µs.

It is not currently possible to line-update the DMD within a time interval as short as 0.5 µs, because a resonant reset must be applied to the deformable beam prior to each line update. This resonant reset consists of a pulse train typically 2 µs long ($\tau_1$) followed by a beam settling time of 12 µs ($\tau_2$) before the differential bias can be reapplied. Its purpose is to unstick the beam from its landed position in contact with the landing surface.

Accordingly, an alternate update scheme must be employed for DMDs running at TV rates and supporting 128 grey levels.

SUMMARY OF THE INVENTION

It is possible to solve the foregoing problem by using the electromechanical latching properties of the bistable DMD to enable the application of a field-update technique requiring only a single resonant reset per video field. Employing this technique, 128 grey levels are readily supported.

In line-updating, the voltages on all of the address electrodes within a given row are changed simultaneously with the application of the transistor gate pulse. Just prior to the application of the gate pulse, a resonant reset is performed on all pixels in the DMD array. After reset, all of the pixels outside of the given line return to their original landing angles. Those within the given line rotate to the updated landing angles for that line. If resonant reset is not performed prior to each line-update, then some pixels will stick and not be free to rotate to their new landing angles.

In order to avoid a resonant reset each line the field-update technique is employed, in this technique the DMD is operated in a mode where the beams are electronically latched to their old landing angles and cannot respond to the new address voltages that are being applied. Using this arrangement, the address electrodes are still updated one line at a time, but the landing states of the beams are updated once each field.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1A:
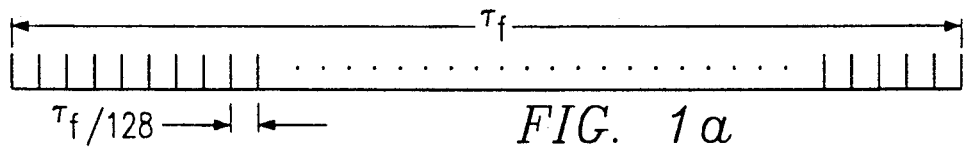
FIGS. 1a and 1b show two techniques of dividing the frame-time into fields for achieving 128 grey levels.

There are two approaches to pulse-width modulation. The first approach, shown in FIG. 1a, is to divide the video frame period $\tau_f$ into 128 equal time intervals or fields. During each field, all of the pixels in the array are addressed to one of two states; the positive landing angle (on) or the negative landing angle (off).

Figure 1B:
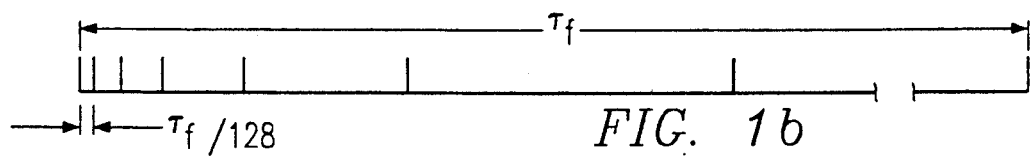

In FIG. 1b, the second approach is to express the 128 equal time intervals as combinations of seven time intervals, each interval being a multiple of two times the previous interval. The seven time intervals would be the multiples 1, 2, 4, 8, 16, 32, and 64 of $\tau_f/128$. This approach minimizes the amount of off-chip frame buffer memory that is required.

Figure 2:
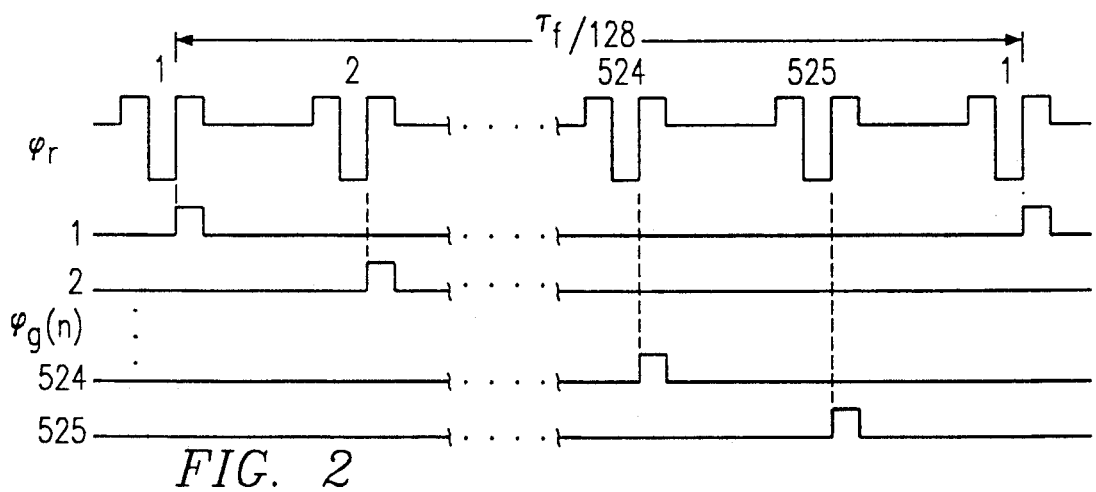
FIG. 2 shows a timing diagram of the bistable DMD for achieving line-updating.
Figure 3:
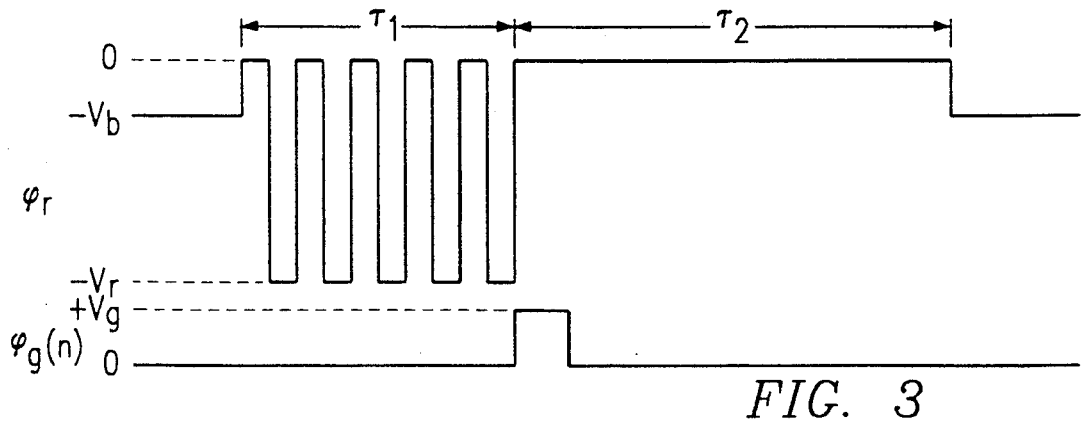
FIG. 3 shows a timing diagram of a time magnified portion of FIG. 2 in the vicinity of the reset pulse.
Figure 7:
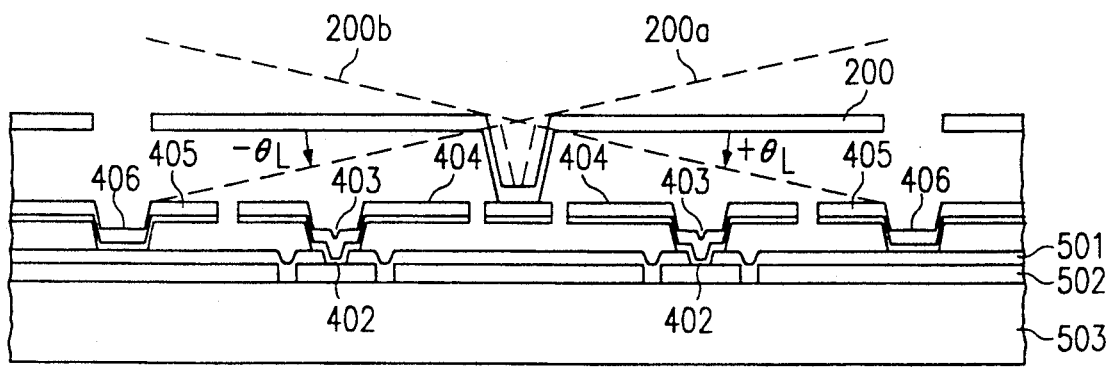
FIG. 7 shows operation of the scan in two states.

The line update timing sequence for achieving pulse-width modulation is shown in FIG. 2. The voltages on all of the address electrodes within the nth row of the DMD array are changed simultaneously with the application of a transistor gate pulse $\phi_g(n)$. Just prior to the application of the gate pulse, a resonant reset pulse $\phi$ is applied to all rotatable beams in the DMD array. Details of the resonant reset pulse are shown in FIG. 3. $V_b$ is the differential bias level and $V_r$ is the reset level. The purpose of the reset pulse is to unstick the beam 200 (FIG. 7) from its landed position in contact with the landing pad 405. FIG. 7. The frequency of the reset pulse train is chosen to be the natural mechanical resonant frequency. After reset, all of the pixels outside of the given line return to their original landing angles. Those within the given line rotate to the updated landing angles for that line. If resonant reset is not performed prior to each line-update, then some pixels will stick and not be free to rotate to their new landing angles.

In order to avoid a resonant reset each line, the DMD is operated in a mode where the beams are electronically latched to their old landing angles and cannot respond to the new address voltages that are being applied. Using this arrangement, the address electrodes are still updated one line at a time, but the landing states of the beams are updated once each field.

Figure 4:
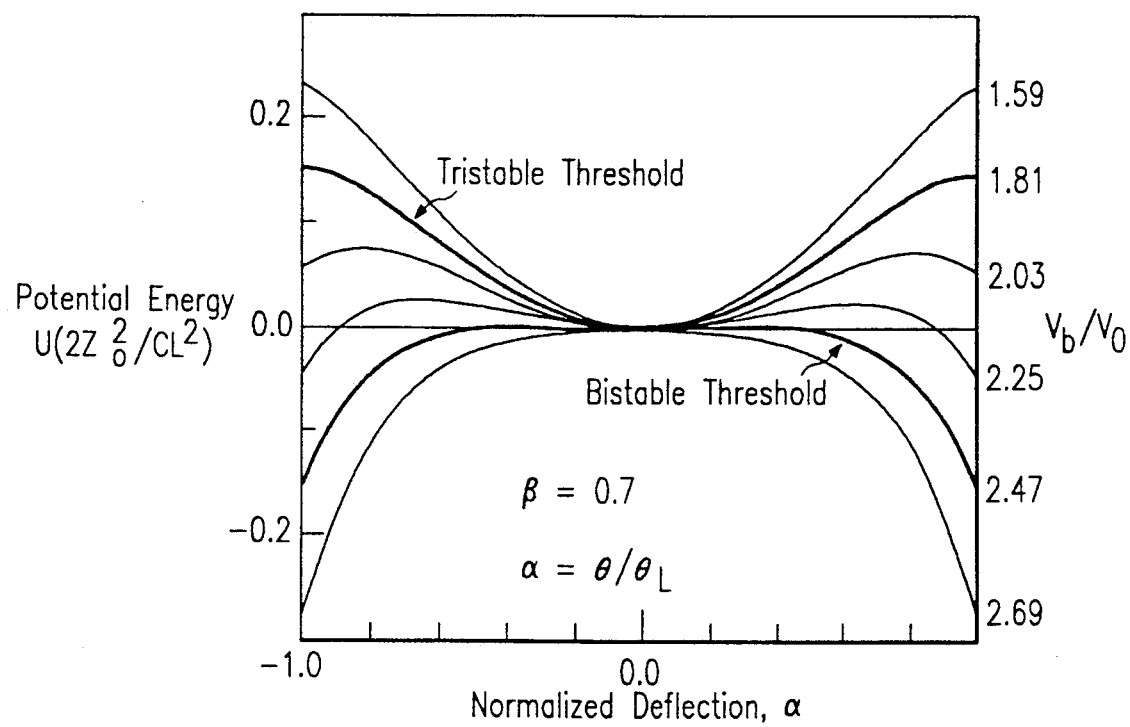
FIGS. 4 and 5 are energy diagrams for various bias and address voltages.

As shown in FIG. 4, the electromechanical latching of the beams is accomplished by applying a differential bias $V_b$ that is above the tristable threshold level. For differential bias levels above the tristable threshold, potential energy minima develop at the two landing angles $\theta = \pm \theta_L$. Once a beam is addressed to one of the landing angles, it is trapped in the potential energy well at that landing angle (electromechanically latched) until the differential bias is removed.

Figure 5:
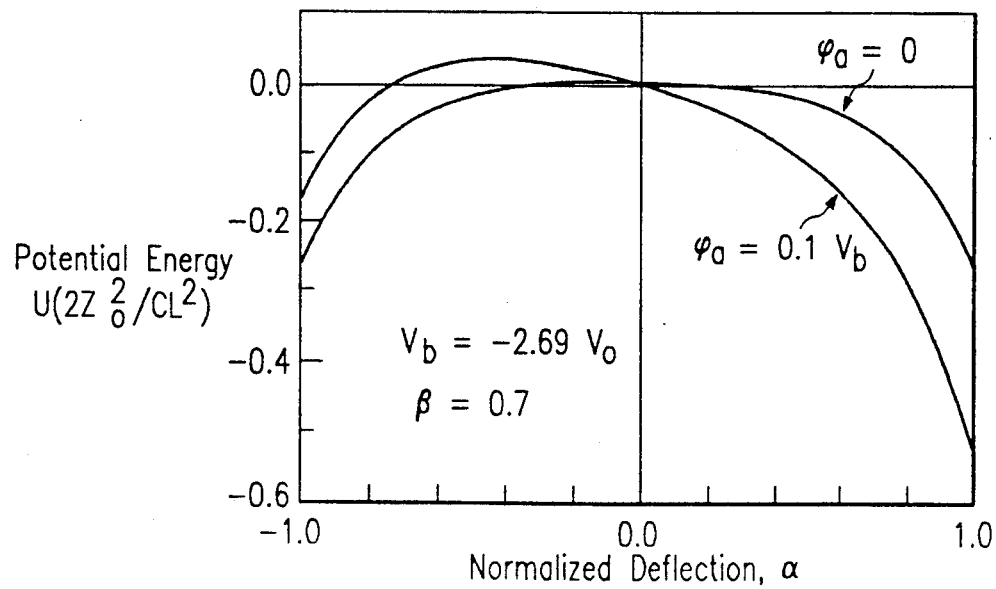

Electromechanical latching is illustrated in FIG. 5. Here the potential energy is shown for a differential bias level $V_b$ that is above the bistable threshold level. For a beam addressed to the negative landing angle, the beam remains trapped in the potential energy well at the negative landing angle, even in the presence of an address voltage $\phi_a$ on the positive address electrode.

Figure 6:
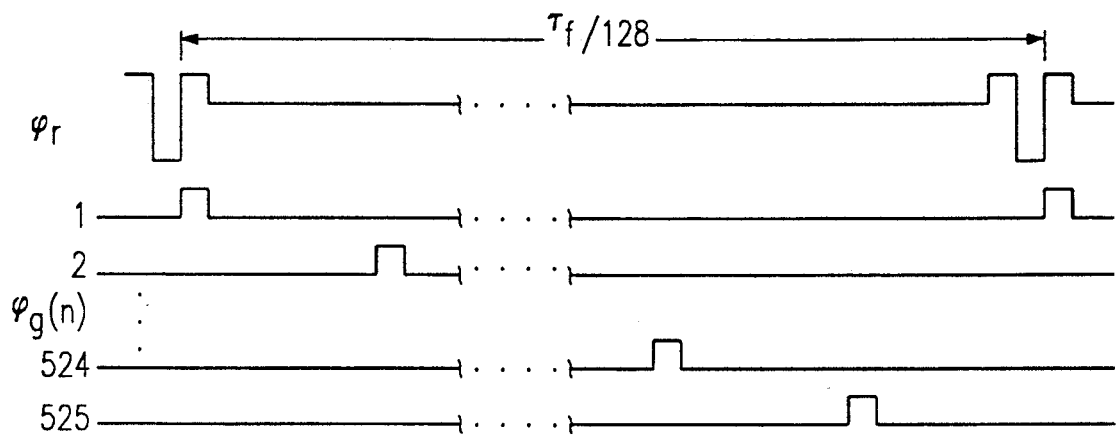
FIG. 6 shows a timing diagram of the bistable DMD for achieving field-updating.

The timing sequence for field-updating is shown in FIG. 6. The differential bias level applied to beam 200 (FIG. 7) is sufficiently large to insure electromechanical latching. At the beginning of each video field, a resonant reset is performed on all of the beams in the array. The differential bias is then applied and the beams respond to the address electrode voltages, rotate to the landing angles, and are latched there. The address electrode voltages are then updated one line at a time at the required line rate of 0.5 µs per line. During this time, the beams remain latched at the landing angles of the previous field. Once all lines of address electrodes in the array have been updated, a resonant reset is performed and the differential bias reapplied in order to latch the beams to the new landing angles.

Field-updating has two advantages. First, shorter field times are achieved, so that more grey shade levels can be displayed. Second, the number of landings is reduced by a factor equal to one-half the number of lines in the array (525), insuring a longer operating life.

Figure 8:
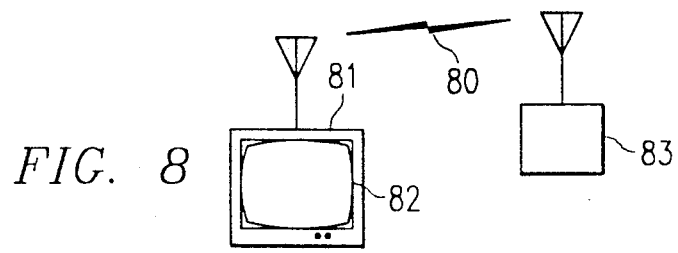
FIG. 8 shows a HDTV system using the inventive concept.

FIG. 8 shows a HDTV system with transmitter/antenna 83 sending a signal 80 received by HDTV 81. A pixel array is used to form the images on projection screen 82.

Although this description describes the invention with reference to the above specified embodiments, the claims and not this description limited the scope of the invention. Various modifications of the disclosed embodiment, as well as alternative embodiments of the invention, will become apparent to persons skilled in the art upon reference to the above description. Therefore, the appended claims will cover such modifications that fall within the true scope of the invention.

What is claimed is:

1. The method of field addressing an array of electromechanical pixels wherein each of said pixels assume one of two or more selected stable states according to a set of selective address voltages, said method comprising the steps of:

electromechanically latching, by applying a bias voltage to said array of pixels, each of said pixels in one of said selected stable states wherein each of said pixels is trapped in a potential energy well;

applying a new set of selective address voltages to all said pixels in said array;

electromechanically unlatching, by removing said bias voltage from said array, said pixels from their previously addressed state;

allowing said array of pixels to assume a new state in accordance with the new set of selective address voltages; and electromechanically latching, by reestablishing said bias voltage, each of said pixels.

2. The method of claim 1 and further comprising the step of applying a reset pulse to all of said pixels of said pixels of said array subsequent to said allowing step and prior to said electromechanically latching step to assure each of said pixels assumes an appropriate state according to said new set of selective address voltages.

3. The method set forth in claim 2 wherein said reset pulse is a pulse train.

4. The method set forth in claim 3 further comprising the step of selecting said pulse train to have the same electromechanical frequency of said pixels.

5. The method of claim 1 wherein said array of electromechanical pixels has a plurality of rows, each of said rows having a plurality of address electrodes.

6. The method of claim 5 wherein the selective set of address voltages is applied to each of said plurality of rows one row at a time.

7. The method of claim 1 wherein said bias voltage is above a tristable threshold voltage for at least one of said electromechanical pixels.

8. The method of claim 1 wherein said array of electromechanical pixels is used to form images on a projection screen of an HDTV system.

* * * * *